Patented Sept. 21, 1943

2,329,775

UNITED STATES PATENT OFFICE 2,329,775

PROCESS FOR ELECTROLYTIC REFINING OF COPPER

Karl A. Lindner, Plainfield, N. J., and Hugh M. Shepard, Baltimore, Md., assignors to American Smelting and Refining Company, New York, N. Y., a corporation of New Jersey No Drawing. Application March 19, 1940, Serial No. 324,746

4 Claims. (Cl. 204—106)

In the electrolytic refining of copper, as the solution of the anodes proceeds, the electrolyte in the cells gradually becomes fouled through the accumulation of arsenic and other impurities, the presence of excessive amounts thereof in the electrolyte being detrimental to the production of refined copper. Consequently, portions of the electrolyte from the cells are diverted to special "regenerating cells" where the whole of the metal, including the impurities, is deposited on cathodes, insoluble anodes being employed for this purpose. The first portions of the copper deposited in the regenerating cells are fairly pure, and it is a not unusual practice to produce in the regenerating cells the thin copper cathode starting sheets required for the main refining cells. However, the last part of the metal deposited in the regenerating cells is a very impure sludge, being high in impurities detrimental to the copper refining operation, such impurities being importantly arsenic and antimony. Since the impure sludge is returned to the copper furnaces and smelted down to anode copper, the removal of such detrimental impurities from the sludge is essential in order to prevent reintroduction of such impurities into the main refining tanks.

Such detrimental impurities, which are present in substantial amounts are, importantly arsenic and antimony, as has been indicated above; and the present invention provides an improved process for the substantially complete elimination of the arsenic and antimony contents of such arsenical copper sludge, or at least the reduction thereof to unimportant amounts.

The improved process is based upon the present discovery that large amounts of both arsenic and antimony can be eliminated by roasting the sludge at a dull red heat, thereby volatilizing out such arsenic and antimony as are releasable by the heat treatment, it being found in practice that about 40 per cent of the total arsenic and about 90 per cent of the antimony present in the sludge can be so eliminated by the roasting operation; and the elimination of at least the arsenic may be rendered substantially greater if the roasted residue be leached with a caustic alkali solution under controlled conditions, as will be described in fuller detail hereinafter.

In carrying out the process, the sludge, either in washed or unwashed condition, is roasted in a suitable furnace in an oxidizing atmosphere, the roasting furnace being a muffle, or a rotary calciner, or any other type of roasting furnace which may be available. The temperature is raised slowly until it reaches approximately 500° F., the sludge being roasted at this temperature with stirring until all fuming has ceased, which requires usually from 1 to 2 hours. When visible fuming of the charge has ceased, the temperature of the roasting furnace may be increased and held at a dull red heat until volatilization ceases.

The roasted sludge then is leached, preferably with a solution of caustic alkali, such as, for example, sodium hydroxide, with or without the presence of the corresponding alkali sulphide. However, a straight sodium hydroxide leach is preferred, as the increase in efficiency of arsenical extraction when sodium sulphide is used appears not to compensate for its higher cost and handling difficulties.

In practice, the roasted calcine is leached with sodium hydroxide solution in the proportion of 4000 pounds of calcine to 240 cubic feet of 75 grams per liter caustic soda solution, the leaching period being for 2 hours at a temperature of 180° F.

The results of the procedure indicate that by far the major portion of the antimony is removed by volatilization during the roasting, it being possible to operate so as to obtain a substantially complete elimination thereof.

It has been found in practice that the roasting temperature employed is not critical, except that it should not be sufficiently high to sinter the charge. Temperatures of even from 900° F. to 1150° F. have been employed without serious detriment to complete roasting. It is found in practice that in the roasting operation higher percentages of arsenic are removed when sludge which has been washed previously with water is the material being treated. However, whether the sludge be unwashed or washed is of no great consequence in regard to the final elimination, as when the roast is followed by the leaching, there results a total arsenic removal from unwashed sludge that approximates the total arsenic removal from sludge that has been washed with water prior to the roasting.

The process is illustrated by the following illustrative examples:

EXAMPLE 1

An arsenical copper sludge assaying 45.6% Cu, 19.41% As, and 4.53% Sb, was the material which was treated. 200 parts by weight of this sludge were washed with water, and roasted as described above at about 500° F., and the roasted calcine then was leached with 75 grams per liter of caustic soda, as has been described above.

There were removed by the roasting 68.80% of the arsenic content and 93.90% of the antimony content.

The leaching treatment increased the total arsenic extraction to 98.20% of the total original arsenic present in the sludge. No further reduction in antimony was obtained by the leaching step, but there was accomplished an elimination of the antimony in the roasting to unimportant amounts.

EXAMPLE 2

The same material, but unwashed, was treated in similar manner. The result showed 48.80% of the original arsenic removed by the roasting and in this case 92.50% of the antimony was removed. In the leaching operation, a total arsenic removal of 93.60% of the original arsenic content was effected, and an additional 7.34% of the antimony was removed.

EXAMPLE 3

Sludge of the same composition was roasted at 900° F. at the discharge end of a rotary calciner. There were roasted 4,540 pounds of sludge in 5 hours, the sludge being charged into the calciner at the rate of 908 pounds per hour. The sludge in this instance was unscreened, although it is found in practice that the sludge should be crushed and screened through a suitable screen, for instance a 1-inch mesh screen before roasting in order to obtain maximum roasting efficiency.

The roasted calcine was then leached with caustic soda solution in the proportion of 4000 pounds of calcine to 240 cubic feet of 75 grams per liter of sodium hydroxide, as has been stated above.

The results of the procedure are indicated by the following table:

COPPER, ARSENIC AND ANTIMONY BALANCE OF RUN NO. 1

*Calcining data*

| | Dry weight sludge, pounds | Copper | | | Arsenic | | Antimony | |
|---|---|---|---|---|---|---|---|---|
| | | H₂O sol., per cent | Total | | Per cent | Pounds | Per cent | Pounds |
| | | | Per cent | Pounds | | | | |
| Sludge charged | 4,540 | 4.32 | 35.94 | 1,630 | 18.72 | 850 | 2.77 | 126 |
| Calcine discharged | 4,010 | 1.62 | 41.15 | 1,650 | 14.62 | 586 | 0.67 | 27 |
| Removed, pounds | 530 | | | 20 (Gain) | | 264 | | 99 |
| Removed, per cent of input | 11.6 | | | | | 31.1 | | 78.6 |

*Leaching data*

INPUT

| | Sludge weight, pounds | Total copper | | Arsenic | | Antimony | |
|---|---|---|---|---|---|---|---|
| | | Per cent | Pounds | Per cent | Pounds | Per cent | Pounds |
| Calcine | 66.5 | 41.15 | 27.4 | 14.62 | 9.7 | 0.67 | 0.45 |

OUTPUT

| | | | | | | | |
|---|---|---|---|---|---|---|---|
| Leach liquor | 35 gal | | | 25.41 g./l. | 7.4 | 0.48 g./l. | 0.14 |
| Leached calcine | 50 lbs | 49.78 | 24.9 | 4.97 | 2.5 | 0.66 | 0.33 |
| Total output | | | 24.9 | | 9.9 | | 0.47 |
| Removed, pounds | | | | | 7.2 | | 0.12 |
| Removed, per cent of input | | | | | 74.3 | | 26.6 |

*Summary*

| | As | Sb |
|---|---|---|
| | Per cent | Per cent |
| Removed by roasting | 31.1 | 78.6 |
| Removed by leaching, based on weight of sludge | 51.2 | 5.7 |
| Removed by both operations | 82.3 | 84.3 |

Additional operating results show that when this same sludge is roasted at 1150° F. and at the rate of 700 pounds per hour, eliminations of 40 per cent of the arsenic and 80 per cent of the antimony present were obtained. Leaching the roasted sludge with sodium hydroxide in the manner described above increases the removal of arsenic to over 80 per cent. Consequently, although under these conditions just described the arsenic and antimony removals were not so complete as in other runs reported herein, nevertheless it is shown even here that the treatment of the arsenical sludges by this procedure very materially reduces the amount of arsenic and antimony impurities returned to the main refining tanks when the sludge is smelted to anode copper as whatever arsenic and antimony are in the sludge, these impurities are carried into the copper during the smelting.

If desired, the copper dissolved by the caustic alkali leach may be recovered by passing the solution over metallic iron.

The leach solution now containing arsenic and antimony may be discarded, preferably after separation of the arsenic and antimony contents of the solution by any suitable procedure, such as by precipitation with lime. Except for the difficulty of effecting this arsenic and antimony separation from acid solution, an acid, such as sulphuric acid, may be used as the leaching agent.

The leached roasted calcine is returned to the copper anode furnaces and smelted therein to anode copper for refining as anodes in the main refining system.

What is claimed is:

1. In the art of electrolytic refining of copper wherein the electrolyte of the refining cell has become fouled through the accumulation of substantial quantities of arsenic, antimony and other impurities and wherein a portion of the electrolyte is withdrawn from the refining cell circulatory system into a regenerating cell containing an insoluble anode and a cathode and electric current is passed through said last mentioned cell to form a cathode deposit containing substantial quantities of copper, arsenic and antimony, the steps of recovering anode copper free from arsenic, antimony and other impurities which consists in calcining the cathode deposit of the regenerating cell at about 500° F. in an oxidizing atmosphere to volatilize from said deposit a substantial portion of the arsenic and a major portion of the antimony present therein, then subjecting the so denuded calcine to a leaching solution of the group consisting of caustic alkali and caustic alkali with alkali sulphide whereby to abstract substantially all the arsenic remaining in said calcine producing a calcine substantially free of the arsenic and antimony originally present in the cathode deposit of the regenerating cell and then smelting the residual leached calcine to form anode copper for the electrolytic refining cell.

2. In the art of electrolytic refining of copper wherein the electrolyte of the refining cell has become fouled through the accumulation of substantial quantities of arsenic, antimony and other impurities and wherein a portion of the electrolyte is withdrawn from the refining cell circulatory system into a regenerating cell containing an insoluble anode and a cathode and electric current is passed through said last mentioned cell to form a cathode deposit containing substantial quantities of copper, arsenic and antimony, the steps of recovering anode copper free from arsenic, antimony and other impurities which consists in calcining the cathode deposit of the regenerating cell at about 500° F. in an oxidizing atmosphere to volatilize from said deposit a substantial portion of the arsenic and a major portion of the antimony present therein, then subjecting the so denuded calcine to a caustic alkali leaching solution to abstract substantially all the arsenic remaining in said calcine producing a calcine substantially free of the arsenic and antimony originally present in the cathode deposit of the regenerating cell and then smelting the residual leached calcine to form anode copper for the electrolytic refining cell.

3. In the art of electrolytic refining of copper wherein the electrolyte of the refining cell has become fouled through the accumulation of substantial quantities of arsenic, antimony and other impurities and wherein a portion of the electrolyte is withdrawn from the refining cell circulatory system into a regenerating cell containing an insoluble anode and a cathode and electric current is passed through said last mentioned cell to form a cathode deposit containing substantial quantities of copper, arsenic and antimony, the steps of recovering anode copper free from arsenic, antimony and other impurities which consists in calcining the cathode deposit of the regenerating cell at about 500° F. in an oxidizing atmosphere to volatilize from said deposit a substantial portion of the arsenic and a major portion of the antimony present therein, then subjecting the so denuded calcine to an alkali caustic-alkali sulphide leaching solution to abstract substantially all of the arsenic remaining in said calcine producing a calcine substantially free of the arsenic and antimony originally present in the cathode deposit of the regenerating cell and then smelting the residual leached calcine to form anode copper for the electrolytic refining cell.

4. In the art of electrolytic refining of copper wherein the electrolyte of the refining cell has become fouled through the accumulation of substantial quantities of arsenic, antimony and other impurities and wherein a portion of electrolyte is withdrawn from the refining cell circulatory system into a regenerating cell containing an insoluble anode and a cathode and electric current is passed through said last mentioned cell to form a cathode sludge deposit containing substantial quantities of copper, antimony and arsenic, the steps of roasting said sludge deposit in an oxidizing atmosphere whereby to volatilize and drive off from said sludge deposit a substantial portion of the arsenic and at least the major portion of the antimony originally present therein, then subjecting the so denuded calcined sludge deposit to a sodium hydroxide leaching solution containing approximately 75 grams of caustic per liter whereby to extract substantially all of the arsenic from said deposit producing a calcine containing a substantial quantity of the copper originally present in said sludge deposit and denuded of substantially all arsenic and antimony originally present therein, then smelting the residual leached calcine so produced to form anode copper for the electrolytic refining cell.

KARL A. LINDNER.
HUGH M. SHEPARD.